United States Patent
Park et al.

(10) Patent No.: US 9,792,362 B2
(45) Date of Patent: Oct. 17, 2017

(54) VIDEO SEARCH SYSTEM AND METHOD

(71) Applicant: Hanwha Techwin Co., Ltd., Changwon-si (KR)

(72) Inventors: Dong Jun Park, Changwon-si (KR); Jeong Eun Lim, Changwon-si (KR); Ho Jung Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 303 days.

(21) Appl. No.: 14/468,532

(22) Filed: Aug. 26, 2014

(65) Prior Publication Data

US 2015/0127626 A1    May 7, 2015

(30) Foreign Application Priority Data

Nov. 7, 2013 (KR) ......................... 10-2013-0134994

(51) Int. Cl.
     *G06F 17/30*      (2006.01)

(52) U.S. Cl.
     CPC .... *G06F 17/30837* (2013.01); *G06F 17/3079* (2013.01)

(58) Field of Classification Search
CPC ........... G06F 17/30837; G06F 17/3079; G06F 17/30867; G06F 17/30277; G06F 17/30864; G06F 17/30793; G06G 17/30811; G06T 7/20; G06T 7/008; G06T 2207/10016; G11B 27/34
See application file for complete search history.

(56) References Cited

U.S. PATENT DOCUMENTS

| 8,102,406 B2 | 1/2012 | Peleg et al. | |
|---|---|---|---|
| 2002/0051081 A1* | 5/2002 | Hori | G11B 27/005 348/553 |
| 2003/0014758 A1* | 1/2003 | Kim | G06F 17/30843 725/87 |
| 2003/0016945 A1* | 1/2003 | Nakamura | G06F 17/30787 386/239 |
| 2003/0081937 A1* | 5/2003 | Li | A63B 24/0003 386/241 |

(Continued)

FOREIGN PATENT DOCUMENTS

| JP | 2003-298981 A | 10/2003 |
|---|---|---|
| KR | 10-0547370 B1 | 1/2006 |
| KR | 10-0661560 B1 | 12/2006 |

OTHER PUBLICATIONS

Ning Liu, Hefeng Wu, and Liang Lin—"Hierarchical Ensemble of Background Models for PTZ-Based Video Surveillance"—IEEE Transactions on Cybernet . . . > vol. 45 Issue: 1—Jan. 2015—pp. 90-102.*

(Continued)

*Primary Examiner* — Anh Ly
(74) *Attorney, Agent, or Firm* — Sughrue Mion, PLLC

(57) ABSTRACT

Provided is a video search system and method. The video search system includes: a search engine configured to extract video data matching a search condition from an original video; and a browsing engine configured to generate a summarized video based on the extracted video data, render a plurality of objects in the summarized video on a background model in an overlapping manner in an object appearing order in the original video, and display the rendered objects.

18 Claims, 10 Drawing Sheets

(56) References Cited

U.S. PATENT DOCUMENTS

| | | | | |
|---|---|---|---|---|
| 2003/0182620 A1* | 9/2003 | Errico | H04N 21/23614 | 715/202 |
| 2004/0088723 A1* | 5/2004 | Ma | G06F 17/30787 | 725/19 |
| 2004/0095374 A1* | 5/2004 | Jojic | G06T 7/2006 | 715/716 |
| 2004/0170321 A1* | 9/2004 | Gong | G06F 17/30802 | 382/173 |
| 2004/0207656 A1 | 10/2004 | Lee et al. | | |
| 2005/0120390 A1* | 6/2005 | Nonoyama | H04N 7/17318 | 725/135 |
| 2006/0117356 A1* | 6/2006 | Jojic | G06F 17/30811 | 725/88 |
| 2007/0168864 A1* | 7/2007 | Yamamoto | G06F 17/30265 | 715/716 |
| 2008/0112684 A1* | 5/2008 | Matsushita | G06F 17/30802 | 386/278 |
| 2008/0163283 A1* | 7/2008 | Tan | H04N 7/163 | 725/20 |
| 2009/0100462 A1* | 4/2009 | Park | G06F 17/30849 | 725/38 |
| 2009/0219300 A1* | 9/2009 | Peleg | G06F 17/30843 | 345/630 |
| 2010/0070523 A1* | 3/2010 | Delgo | G06F 17/3079 | 707/769 |
| 2010/0104261 A1* | 4/2010 | Liu | G11B 27/034 | 386/241 |
| 2010/0322302 A1* | 12/2010 | Rodriguez | H04N 21/631 | 375/240.01 |
| 2011/0137753 A1* | 6/2011 | Moehrle | G06Q 30/02 | 705/27.1 |
| 2011/0267544 A1* | 11/2011 | Mei | G06K 9/00751 | 348/700 |
| 2012/0027371 A1* | 2/2012 | Hackett | G06F 17/30784 | 386/223 |
| 2012/0033949 A1* | 2/2012 | Lu | G11B 27/034 | 386/285 |
| 2012/0076357 A1* | 3/2012 | Yamamoto | G06K 9/00711 | 382/103 |
| 2012/0123780 A1* | 5/2012 | Gao | G06K 9/00751 | 704/245 |
| 2012/0173748 A1* | 7/2012 | Bouazizi | H04L 65/4084 | 709/231 |
| 2013/0129144 A1* | 5/2013 | Chang | G06K 9/62 | 382/103 |
| 2013/0163961 A1* | 6/2013 | Wu | H04N 5/772 | 386/280 |
| 2013/0301727 A1* | 11/2013 | Huang | H04N 19/00587 | 375/240.16 |
| 2014/0205148 A1* | 7/2014 | Hirano | H04N 5/76 | 382/103 |
| 2015/0003805 A1* | 1/2015 | Insua | H04N 21/8549 | 386/230 |
| 2015/0317304 A1* | 11/2015 | An | G11B 27/036 | 386/285 |
| 2016/0379055 A1* | 12/2016 | Loui | G06K 9/00718 | 382/103 |

OTHER PUBLICATIONS

Simon Gibbs et al. "Video widgets and video actors"—Proceeding UIST '93 Proceedings of the 6th annual ACM symposium on User interface software and technology—Nov. 3-5, 1993, pp. 179-185.*

* cited by examiner

VIDEO SEARCH SYSTEM AND METHOD

CROSS-REFERENCE TO RELATED APPLICATIONS

This application claims priority from Korean Patent Application No. 10-2013-0134994, filed on Nov. 7, 2013, in the Korean Intellectual Property Office, the disclosure of which is incorporated herein in its entirety by reference.

BACKGROUND

1. Field

Apparatuses and methods consistent with exemplary embodiments relate to a video search system and method.

2. Description of the Related Art

A video summary is made by configuring a short video via summarization. That is, the video summary is made by reducing a play length of an original video. If a search result is composed of several video sections, a user may be able to determine details of the video sections after reproducing the video of these sections. Such separate reproduction may cause inconvenience to the user, and may also be time-consuming. On the other hand, the video summary is a single video summarized from the search result for reproduction, thereby providing a user with a convenient function of recognizing the details of the video.

SUMMARY

One or more embodiments of the inventive concept provide a search system and method which allows user's convenient video search.

One or more exemplary embodiments will be set forth in part in the description which follows and the inventive concept will be apparent from the description, or may be learned by practice of the presented embodiments.

According to an aspect of an exemplary embodiment, there is provided a video search system which may include: a search engine configured to extract video data matching a search condition from an original video; and a browsing engine configured to generate a summarized video based on the extracted video data, render a plurality of objects in the summarized video on a background model in an overlapping manner in an object appearing order in the original video, and display the rendered objects.

The browsing engine may render the objects by changing a degree of temporal overlapping between the objects in the summarized video while maintaining the object appearing order.

The browsing engine may limit the number of the objects displayed for a predetermined period of time.

The browsing engine may three-dimensionally render the summarized video into a plurality of layers on a time or category basis in response to a user request.

The browsing engine may display the plurality of layers in an overlapping manner and reproduce at least one layer selected from among the plurality of layers.

The browsing engine may remove at least one object corresponding to a canceling condition from the summarized video, if the canceling condition is input.

The browsing engine may display at least one object identified in the summarized video as at least one search condition and remove an object corresponding to a search condition selected from the at least one search condition.

The video search system may further include an indexing engine for generating index data by structuralizing metadata extracted from the original video, and the search engine may extract the index data matching the search condition and the video data corresponding to the extracted index data.

According to an aspect of another exemplary embodiment, there is provided a video search system which may include: a summarized video generation unit configured to generate a summarized video based on a search condition and video data corresponding to the search condition and extracted from original video, render a plurality of objects in the summarized video on a background model in an overlapping manner in an object appearing order in the original video, and display the rendered objects; a three-dimensional (3D) configuring unit configured to three-dimensionally arrange the summarized video into a plurality of layers based on a time or category basis in response to a video change request; and a filtering unit configured to display the summarized video from which an object corresponding to a canceling condition is removed, if the canceling condition is input.

The summarized video generation unit may render the objects by changing a degree of temporal overlapping between the objects in the summarized video while maintaining the object appearing order.

The summarized video generation unit may limit the number of the objects displayed for a predetermined period of time.

The 3D configuring unit may the plurality of layers in an overlapping manner and reproduce at least one layer selected from among the plurality of layers.

The filtering unit may display at least one object identified in the summarized video as at least one search condition and remove an object corresponding to a search condition selected from the at least one search condition.

According to an aspect of still another exemplary embodiment, there is provided a video search method which may include: extracting video data matching a search condition from an original video; and generating a summarized video based on the extracted video data, rendering a plurality of objects in the summarized video on a background model in an overlapping manner in an object appearing order in the original video, and displaying the rendered objects.

The rendering the object may include rendering the objects by changing a degree of temporal overlapping between the objects in the summarized video while maintaining the object appearing order.

The rendering the object may include limiting the number of the objects displayed for a predetermined period of time.

The video search method may further include three-dimensionally rendering the summarized video into a plurality of layers on a time or category basis in response to a user request.

The three-dimensional rendering the summarized video may include displaying the plurality of layers in an overlapping manner and reproducing at least one layer selected from among the plurality of layers.

The video search method may further include removing an object corresponding to a canceling condition from the summarized video, if the canceling condition is input.

The video search method may further include displaying at least one object identified in the summarized video as at least one search condition and removing an object corresponding to a search condition selected from the at least one search condition.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
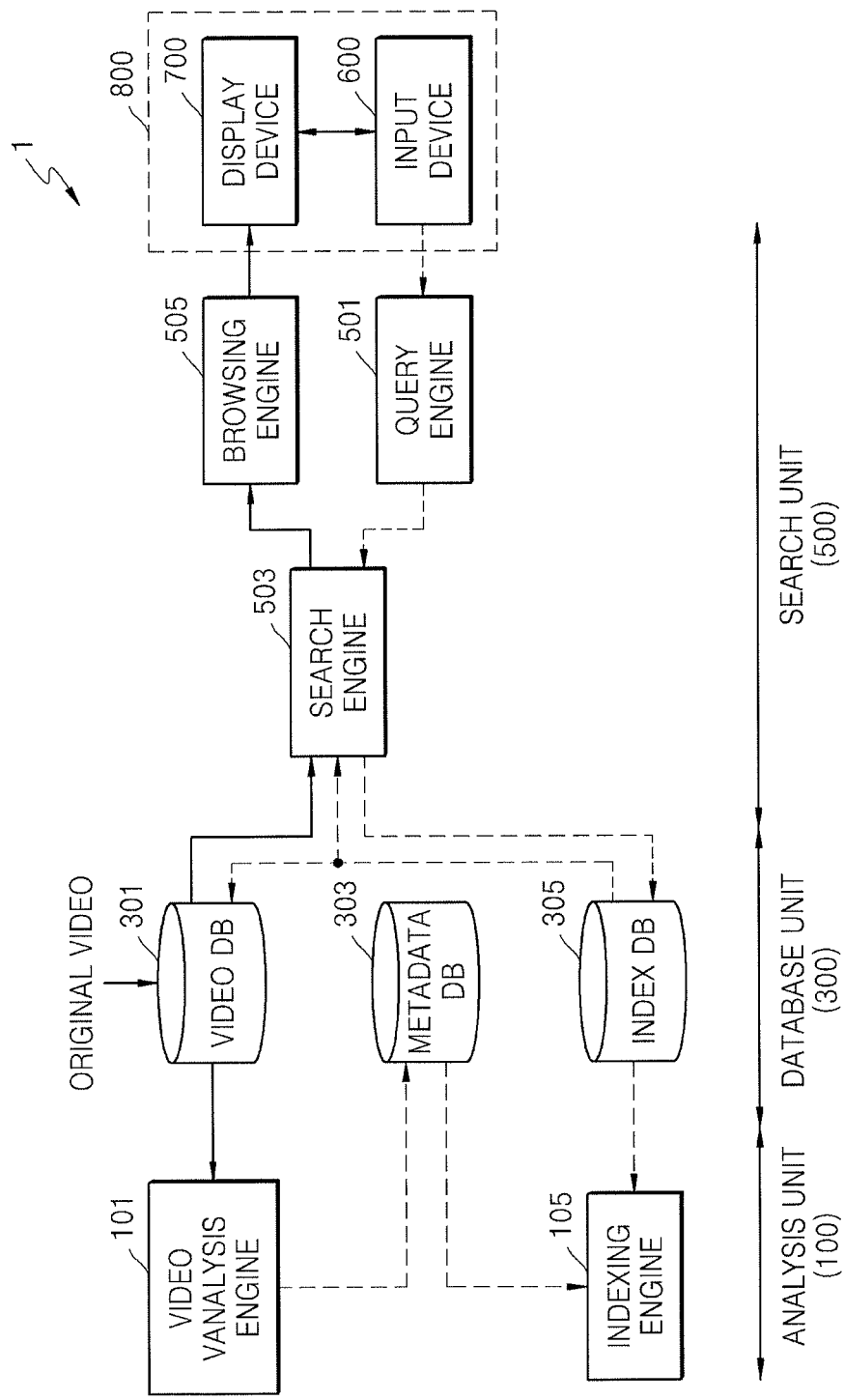
FIG. 1 is a block diagram illustrating a video search system according to an exemplary embodiment.

Reference will now be made in detail to the exemplary embodiments, which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the inventive concept. As used herein, the term "and/or" includes any and all combinations of one or more of the associated listed items. Expressions such as "at least one of," when preceding a list of elements, modify the entire list of elements and do not modify the individual elements of the list.

Hereinafter, various exemplary embodiments will be described with reference to the accompanying drawings. In the following description, a detailed description of known functions and configurations incorporated herein will be omitted when it may obscure the subject matter of the embodiments.

Although ordinal numbers such as "first," "second," and so forth will be used to describe various components, those components are not limited by the terms. The ordinal terms are used only for distinguishing one component from another component.

The terminology used herein is for the purpose of describing embodiments only and is not intended to be limiting. As used herein, the singular forms are intended to include plural forms as well, unless the context clearly indicates otherwise. It will be further understood that the terms "comprises" and/or "has" when used herein, specify the presence of a stated feature, number, step, operation, component, element, or a combination thereof but do not preclude the presence or addition of additional features, numbers, steps, operations, components, elements, or combinations thereof.

The present embodiments may be described in terms of functional block components and various processing steps. Such functional blocks may be realized by any number of hardware and/or software components configured to perform the specified functions. For example, the present embodiments may employ various integrated circuit components, e.g., memory elements, processing elements, logic elements, look-up tables, and the like, which may carry out a variety of functions under the control of one or more microprocessors or other control devices. Similarly, where the elements of the present embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented with an algorithm executed in one or more processors. Furthermore, the present invention could employ conventional techniques for electronics configuration, signal processing and/or control, data processing, and the like. Terms such as "mechanism", "element", "means", "component", etc., may be used in a broad sense, and are not limited to mechanical and physical components. The terms may include a meaning of a series of routines of software in connection with a processor or the like.

FIG. 1 is a block diagram illustrating a video search system 1 according to an exemplary embodiment. Referring to FIG. 1, the video search system 1 includes an analysis unit 100, a database unit 300, and a search unit 500.

The analysis unit 100 analyzes an input original video based on ontology, and stores a result of the analysis in a form of metadata. The analysis unit 100 includes a video analysis engine 101 and an indexing engine 105.

The video analysis engine 101 analyzes the original video, classifies the original video according to a predefined condition such as a predefined category, and extracts attributes of an object detected from the original video, for example, a type, a color, a size, a form, a motion, and a trajectory of the object. A category may be a search condition that a user inputs for a desired such result. That is, according to an exemplary embodiment, a category and a search condition defined in the video search system 1 cooperate with each other, and if a category is added, the search condition is also extended. The video search system 1 defines meanings of categories and a relationship between the categories to accurately define a category of details to be analyzed.

According the present embodiment, a summarized video is generated through cooperation between a search condition and a category, thereby providing, to the user, a semantic search condition that is the same as a search condition provided by the video search system 1. The user may easily recognize details from the summarized video.

The video analysis engine 101 performs a video analysis, such as sensing an appearance and disappearance of an object or sensing a motion of an object, or video interruption in the original video. The video analysis engine 101 performs background region detection, foreground and object detection, object counting, camera tampering detection, and face detection. The video analysis engine 101 calculates brightness, color, texture, and shape information about the video.

Moreover, the video analysis engine 101 generates an event if a result of the video analysis satisfies an event generation condition. Herein, the event may include a system event that is set in a system, such as when a network error occurs or a new camera (not shown) is set. The event may also include a user event set by the user, such as appearing of an object, generation of an image specified by the user (for example, generation of a face that cannot be recognized), change of a screen color, or occurrence of a motion in a preset region of the input video, and generation of an abnormal sound source (for example, a vehicle tire frictional sound (skid), a glass-breaking sound, an alarm sound, an impact sound, and the like), generation of a user-specified sound source (for example, a shout, a scream, a cry, and the like), or generation of a voice having a pitch greater than a threshold value for a sound source.

The video analysis result is stored in the form of metadata in a metadata database 303. In addition to text-based metadata, image-based metadata such as a blob image in a motion region and a background model may also be stored in the metadata database 303.

To facilitate a search, the indexing engine 105 structuralizes and arranges metadata and stores the metadata in an index database 305.

The search unit 500 generates and provides a summarized video including information that matches a search condition input from the user. The search unit 500 may include a query engine 501, a search engine 503, and a browsing engine 505.

The query engine 501 receives the search condition from the user through an input device 600, and analyzes user's requirements from the search condition and reconfigures the user's requirements in a predefined form. For example, the user may input a time period, a camera channel number, a type of an object (a person, a vehicle, or the like), a color, a particular region (a region of interest (ROI)) on a screen, a particular line on the screen, and a particular direction, through the input device 600.

The search engine 503 extracts index data that matches the reconfigured search condition from the index database 305, and extracts video data corresponding to the extracted index data from a video database 301.

The browsing engine 505 generates and renders in real time a summarized video based on the extracted index data and video data. The browsing engine 505 displays time information (an object appearing time, an event occurring time, or the like) in the summarized video. The browsing engine 505 renders a background model and renders one or more moving objects through overlapping on the background model.

Figure 2:
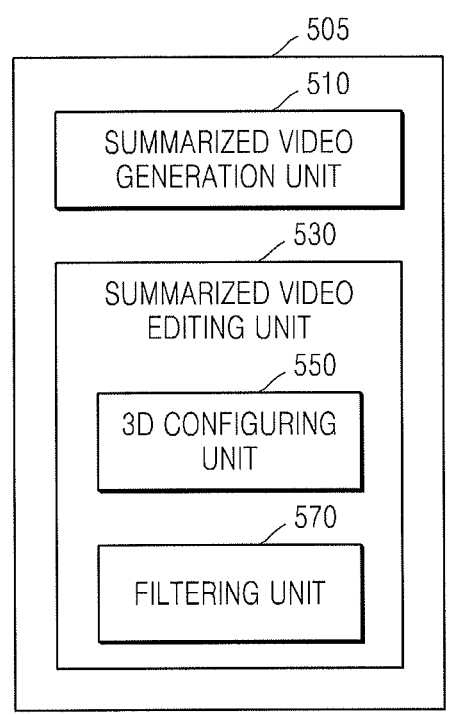
FIG. 2 is a block diagram illustrating a structure of a browsing engine according to an exemplary embodiment.

FIG. 2 is a block diagram illustrating the browsing engine 505 according to an exemplary embodiment.

Referring to FIG. 2, the browsing engine 505 may include a summarized video generation unit 510 and a summarized video editing unit 530.

The summarized video generation unit 510 generates and renders in real time index summarized video based on the index data and the video data that match the search condition.

Video summarization based on a time period, which is one of video summarization methods, is a way to remove a time period during which no moving object exists and to reconfigure the video. According to object-based video summarization, an object in the original video may appear in a different time period in the summarized video. That is, an object appearing period is calculated and reconfigured for the summarized video. According to time-period-based video summarization, a time period of the summarized video cannot be reduced much, such that if there is a motion in the whole time periods of the original video, the summarized video has the same structure as the original video. The object-based video summarization may make it difficult to recognize an action taken in the original video because the appearing time is in a quite different time period. For example, a moving line of one object may be divided into several separate moving lines that appear in the summarized video. In addition, it is necessary to continuously calculate an appearing time of an appearing object in the summarized video, such that when a video of a long time is summarized, a number of objects need to be kept in a memory and the appearing order of the objects in the summarized video needs to be continuously calculated.

According to the present embodiment, the summarized video generation unit 510 renders one or more objects extracted from the summarized video according to the search condition based on the appearing order of the objects in the original video. That is, the appearing order of the objects in the summarized video maintains the appearing order of the objects in the original video. For example, if an object B appears after an object A in the original video, the browsing engine 505 may set the object B to appear simultaneously with or after the object A in the summarized video, and set the object B to at least avoid appearing before the object A. According to the present embodiment, the object appearing order is maintained, such that the memory may be used on a time basis without keeping information about all objects (index data and data of corresponding video) in the memory at the same time. That is, according to the present embodiment a limited queue is configured to keep information about sequentially appearing objects in the memory, thereby efficiently using the memory, improving the speed of generating the summarized video, and linearly configuring the summarized video.

Figure 3:
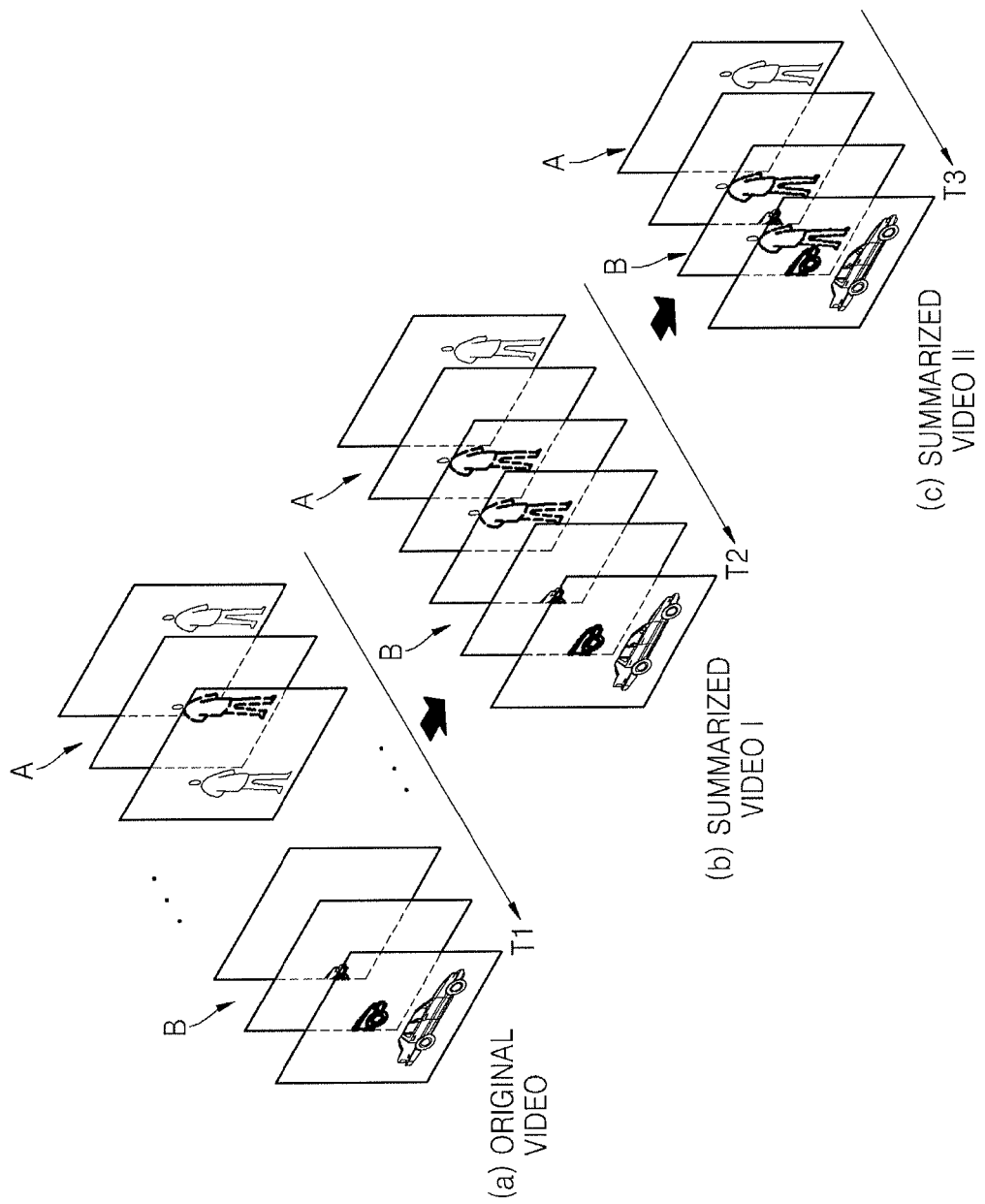
FIG. 3 illustrates an example of displaying summarized video according to an exemplary embodiment.
Figure 4:
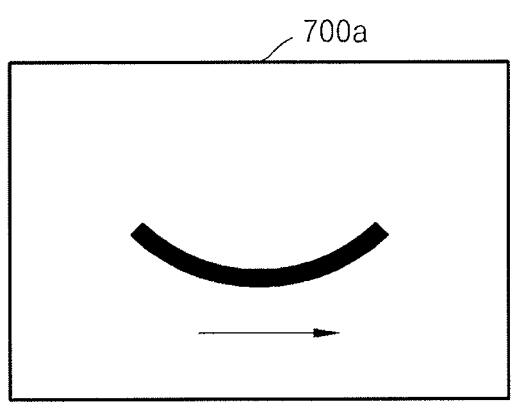
FIG. 4 illustrates an example of a user input for switchover to summarized video according to an exemplary embodiment.

FIGS. 3 and 4 illustrate an example of displaying a summarized video according to an exemplary embodiment.

Referring to FIG. 3, in an original video (a), an object A appears and then disappears for a time T1, and after an elapse of a predetermined period of time, an object B appears.

In summarized video I (b) and summarized video II (c), video data in which the object A and the object B appear is extracted to reduce the play time of the original video into a time T2 and a time T3, respectively. The summarized video I (b) and the summarized video II (c) have different overlapping degrees between the object A and the object B. Under a condition that the object B having a temporally later appearing order than the object A does not appear before the object A, the degree of overlapping between the object A and the object B in the summarized video may be adjusted by adjusting the complexity of the summarized video.

The summarized video generation unit 510 renders the summarized video by limiting the number of appearing objects. It may be confusing if too many objects initially appear at the same time. Thus, the summarized video generation unit 510 may configure the summarized video by limiting the number of objects to, for example, two (2) at most, for several seconds from the start of the summarized video, unless a plurality of objects appear at the same time in the original video.

The summarized video editing unit 530 changes the summarized video from a two-dimensional (2D) structure into a three-dimensional (3D) structure or from the 3D structure to the 2D structure or changes settings of the summarized video. The summarized video editing unit 530 includes a 3D configuring unit 550 and a filtering unit 570.

Upon receiving input of a video change request, the 3D configuring unit 550 changes the 2D summarized video that is being reproduced into 3D summarized video configured of a plurality of summarized video layers on a time or category basis in response to the video change request. The video change request may be a user input that draws a curve from the left to the right or from the right to the left on a screen 700a (FIG. 4) on which the summarized video is being reproduced, by using a touch or the input device 600 such as a mouse.

Figure 5:
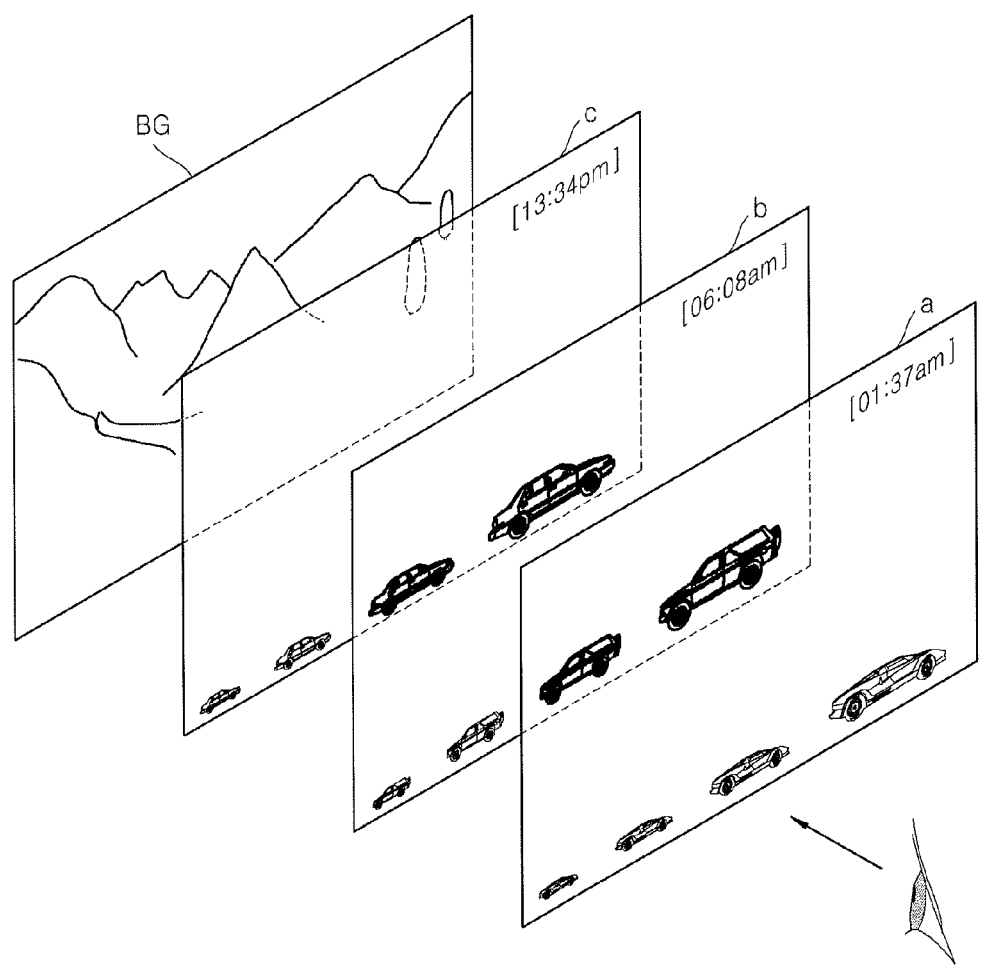
FIG. 5 illustrates an example of a plurality of summarized video layers according to an exemplary embodiment.

FIG. 5 illustrates an example of rendering a plurality of summarized video layers according to an exemplary embodiment.

Referring to FIG. 5, a summarized video having information about events corresponding to appearing of a vehicle in a particular region may be changed into a plurality of summarized video layers corresponding to a type or color of the vehicle in response to the video change request.

For example, a single summarized video that is being reproduced, in which a plurality of vehicles appearing for a predetermined period of time is rendered on a background model, may be changed into a plurality of summarized video layers including a first layer (a) that is a summarized video of an event corresponding to appearance of a first vehicle at 1:37 AM, a second layer (b) that is a summarized video of an event corresponding to appearance of a second vehicle at 6:08 AM, and a third layer (c) that is a summarized video of an event corresponding to appearance of a third vehicle at 1:24 PM, in response to the image change request. The lowest layer of the screen is a background model BG and a summarized video indicating a temporally preceding event is situated at a higher layer. If the user views the screen, four layers are reproduced in an overlapping manner.

The 3D configuring unit 550 reproduces a summarized video of a layer selected by the user from among the plurality of layers. For example, if the user selects the third layer (c) from among the plurality of layers illustrated in FIG. 5, the summarized video of the third layer (c) may be reproduced on the background model BG on the screen. The user may select one or more layers.

The 3D configuring unit 550 combines a plurality of 3D summarized video layers into a single 2D summarized video and reproduces the 2D summarized video in response to the image change request. The image change request may be a drawing action taken in the same direction as or in a different direction than that of a drawing action for change into a 3D structure, or may be an input that is set differently.

When a summarized video that is a result matching a user's query (search condition) is rendered in real time and reproduced, if a request canceling a particular search condition is input, a new summarized video may be rendered in which details corresponding to the canceling condition are filtered (removed) from the reproduced summarized video. For example, if an initial search condition is white and red vehicles, a summarized video displaying both a white vehicle and a red vehicle is reproduced on the screen. If an input for canceling a white vehicle condition is received, the filtering unit 570 removes the white vehicle from the summarized video that is being reproduced. Thus, on the screen, a summarized video displaying only the red vehicle is reproduced.

Figure 6:
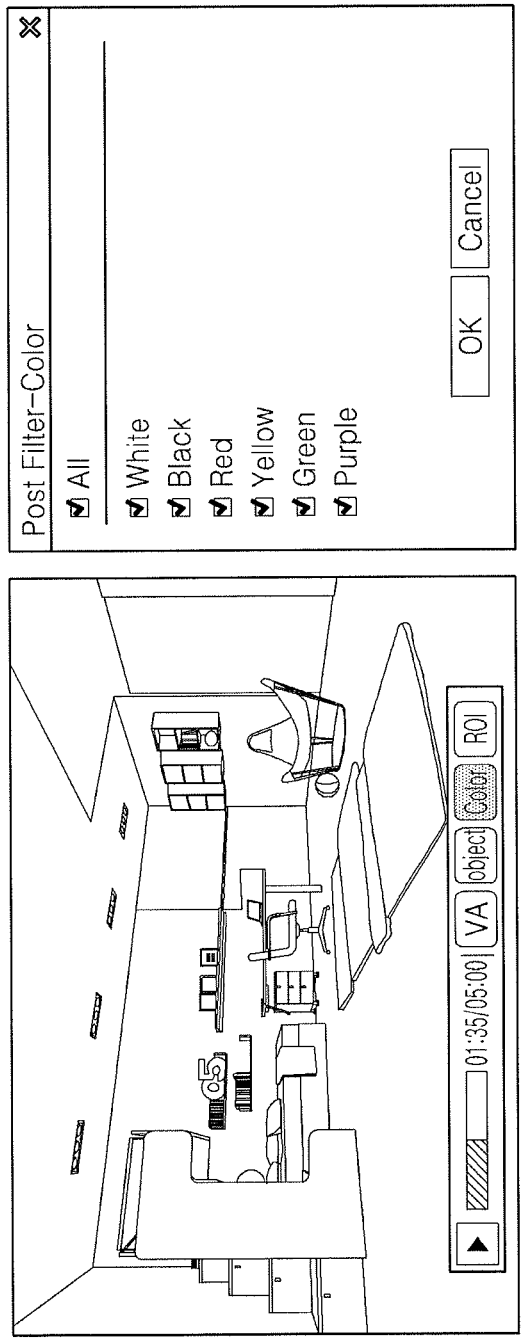
FIGS. 6 and 7 are diagrams illustrating editing of summarized video according to an exemplary embodiment.
Figure 7:
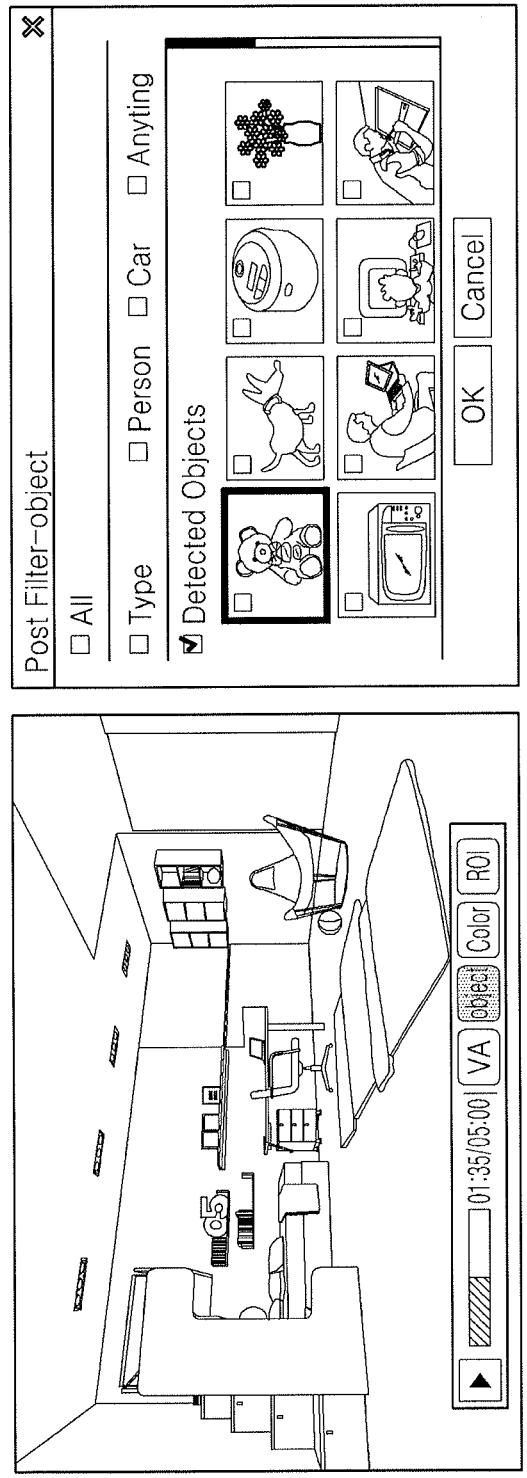

FIGS. 6 and 7 illustrate editing of a summarized video according to an exemplary embodiment.

Referring to FIG. 6, as illustrated in a left portion, a timeline for checking a position (a play time) of a summarized video that is being reproduced is provided and a high-layer category menu including video analytics (VA) selection, object, color, ROI, and the like is provided as a search condition. The user may move a play position by selecting or touching a bar of the timeline or a time scale indicated on the timeline.

Once one of the provided high-layer category menu is selected, a sub category menu of the selected high-layer category is provided on a separate right window as illustrated in a right portion or on the summarized video that is being reproduced. For example, the color category, which is a high-layer category, may include sub categories such as white, black, red, yellow, green, and purple. Once a category is selected by user's selection, a summarized video including information matching the selected category may be generated and reproduced.

The user may make a selection for canceling at least one of colors previously selected during reproduction of the summarized video, and in response to the selection, the filtering unit 570 may generate a summarized video from which data corresponding to a color for which cancelation is requested is removed. For example, if a selection for canceling a sub category "yellow" is input from the user during reproduction of a summarized video including information about vehicles in all colors, the summarized video is updated with a summarized video from which a yellow vehicle is removed, and the updated summarized video is reproduced on the screen.

Referring to FIG. 7, if the object category is selected from the high-layer category menu illustrated in a left portion, a sub category menu of the selected object category is provided on a separate right window or on the summarized video that is being reproduced. For example, the object category, which is the high-layer category, may include sub categories such a type category, a person category, a car category, and an anything category.

The filtering unit 570 provides a 'Detected Object' category as a sub category to provide objects identified in generation of the summarized video as a search condition. If an object the user does not desire to search for is identified in the summarized video, the user may make selection for canceling at least one of the identified objects and in response, the filtering unit 570 generates a summarized video from which data corresponding to the canceling-requested object is removed.

The database unit 300 stores an original video and a video analysis result. The database unit 300 may include a video database 301, a metadata database 303, and an index database 305.

The original video may be a video that is directly transmitted from a camera (not illustrated) which is a video sensor connected to the video search system 1, may be video stored in a digital video recorder (DVR) or a network video recorder (NVR) connected to the video search system 1, or may be video input through various paths over a network (not illustrated).

The original video in the form of a data stream input to the video search system 1 is stored in the video database 301.

The analysis result of the original video is stored in the form of text-based metadata in the metadata database 303. The metadata database 303 stores image-based metadata that is a part of the original video, for example, a blob image of a motion-detected object and a background model.

A user terminal 800 is a terminal used by a user or a security official who manages the video search system 1, and may be a personal computer (PC) or a mobile terminal. The user may control the video search system 1 through the user terminal 800. The user terminal 800 includes the input device 600 that is a user interface capable of inputting a query (search condition) to the video search system 1.

The input device 600 is wiredly or wirelessly connected with the video search system 1 such that the user generates input data for controlling an operation of the video search system 1. The input device 600 may be a keypad, a dome switch, a touch pad (of a contact-type capacitive type, a pressure-type resistive type, an infrared sensing type, a surface ultrasonic conduction type, an integral tension measurement type, a piezoelectric effect type, or the like), a mouse, a remote controller, a jog wheel, or a jog switch. The user terminal 800 sets a display condition of the summarized video by modifying, adding or deleting the search condition with the input device 600.

The user terminal 800 displays the summarized video matching the search condition on a display device 700. The display device 700 provides the summarized video output from the browsing engine 505 to the user, allowing the user to monitor the displayed video. The display device 700 displays a menu item for a user's direct or indirect selection of a search condition such as change between a 2D structure and a 3D structure of the summarized video, a type and position of the object to be displayed on the summarized video, or a particular time. The search condition may be extended by cooperating with a category set in the video analysis engine 101.

The display device 700 provides visual information and/or audible information to the user. The display device 700 may include a liquid crystal panel (LCD), an organic light emitting display (OLED) panel, or an electrophoretic display (EPD) panel. The display device 700 may be provided in the form of a touchscreen to receive an input through a user's touch and may operate as an input interface.

Figure 8:
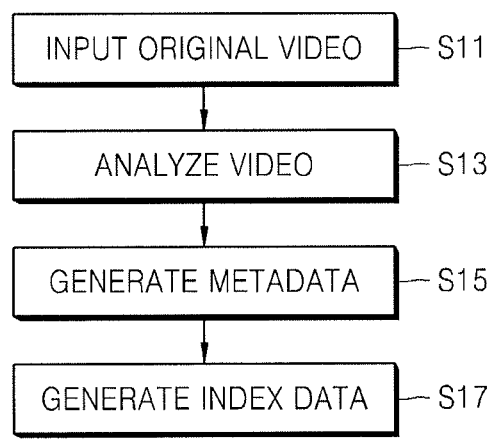
FIG. 8 is a flowchart illustrating a video analysis method of a video search system according to an exemplary embodiment.

FIG. 8 is a flowchart illustrating a video analysis method for the video search system 1 according to an exemplary embodiment.

Referring to FIG. 8, once an original video is input in operation S11, the video search system 1 analyzes the original video by using a classification and analysis module in operation S13. The video search system 1 may analyze the original video according to a predefined category. The category may cooperate with a search condition and the search condition may be set and extended according to a defined category.

The video search system 1 generates and stores metadata that is a result of the analysis of the original video in operation S15. The metadata may include image-based metadata such as a block image and a background model, as well as text-based metadata.

The video search system 1 generates and stores index data by structuralizing and arranging the metadata to facilitate the search in operation S17.

Figure 9:
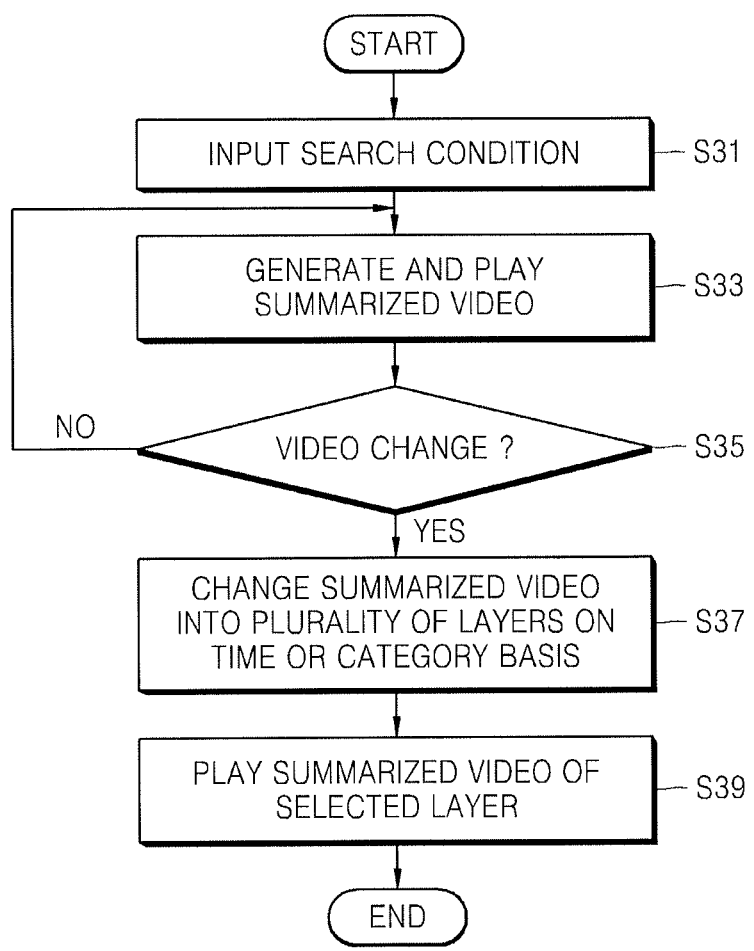
FIGS. 9 and 10 are flowcharts illustrating a video search method of a video search system according to an exemplary embodiment.

FIG. 9 is a flowchart illustrating a video search method for the video search system 1 according to an exemplary embodiment.

Referring to FIG. 9, once a search condition is input from the user in operation S31, the video search system 1 generates and reproduces a summarized video that matches the search condition in operation S33. The video search system 1 extracts index data that matches the search condition and extracts video data corresponding to the index data from the original video. The video search system 1 generates a summarized video based on the extracted video data.

The video search system 1 renders the background model, and in real time renders a moving object in an overlapping manner on the background model, thereby reproducing the summarized video. The video search system 1 may determine an object appearing order in the summarized video to correspond to an object appearing order in the original video, thereby rendering the object. The video search system 1 renders the summarized video by limiting the number of appearing objects for several seconds from the start of the summarized video, unless a plurality of objects appear at the same time in the original video.

Upon input of the video change request in operation S35, the video search system 1 changes a 2D summarized video into a 3D structure in which one or more summarized video layers overlap in operation S37. The video search system 1 may change the 2D summarized video that is being reproduced into a plurality of summarized video layers arranged on a time or category basis, in response to the video change request.

Upon receiving a selection of one of the plurality of layers, the video search system 1 reproduces a summarized video of the selected layer in operation S39. The user may select one or more layers at the same time. The one or more selected layers may be combined and reproduced as a single summarized video.

In a structure where the plurality of summarized video layers overlap, upon input of a request for restoring the 2D summarized video, the video search system 1 restores and reproduces the original 2D summarized video including information about the plurality of layers.

Figure 10:
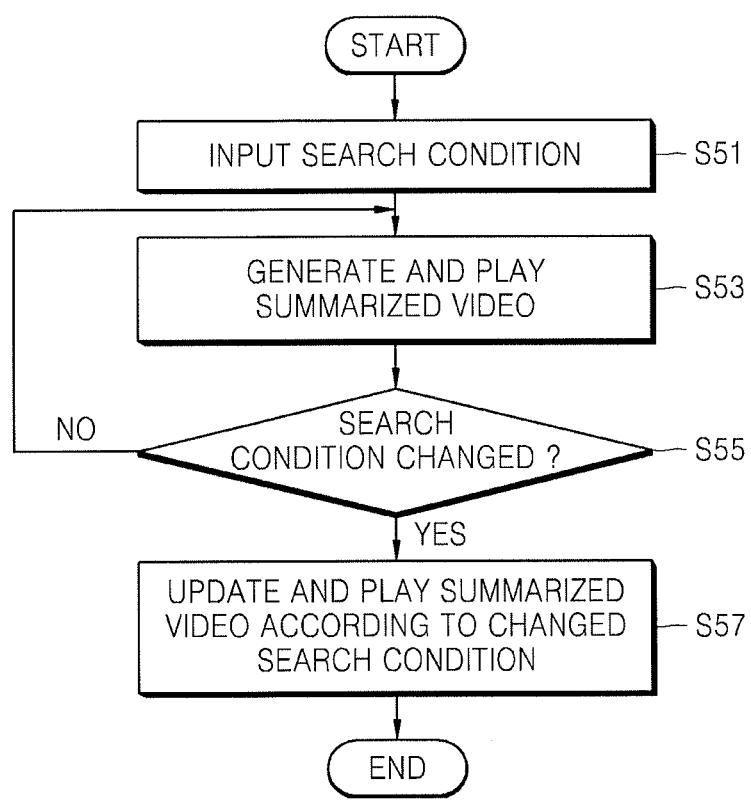

FIG. 10 is a flowchart illustrating a video search method for the video search system 1 according to an exemplary embodiment.

Referring to FIG. 10, upon input of a search condition from the user in operation S51, the video search system 1 generates and reproduces a summarized video that matches a search condition in operation S53. The video search system 1 extracts index data that matches the search condition and extracts video data corresponding to index data from the original video. The video search system 1 generates the summarized video based on the extracted video data.

The video search system 1 renders a background model and in real time renders a moving object in an overlapping manner on the background model, thereby reproducing a summarized video. The video search system 1 may determine an object appearing order in the summarized video to correspond to an object appearing order in the original video, thereby rendering the object. The video search system 1 renders the summarized video by limiting the number of appearing objects for several seconds from the start of the summarized video, unless a plurality of objects appear at the same time in the original video.

If a change to the search condition is input in operation S55, the video search system 1 updates the summarized video according to the changed search condition and reproduces an updated summarized video in operation S57. If a request for canceling the search condition is input during reproduction of the summarized video that matches the user's search condition, the video search system 1 renders a new summarized video in which details corresponding to the canceling condition are filtered (removed) from the summarized video that is being reproduced. The video search system 1 displays one or more objects identified in the summarized video as a search condition, and upon the input of a canceling request, the video search system 1 updates the summarized video with the summarized video from which an object corresponding to the canceling-requested search condition is removed, and reproduces the updated summarized video.

The above embodiments may improve accuracy and easiness of searching by simultaneously applying multiple filtering to the summarized video, easily changing a summarized video, and applying changes to the summarized video in real time.

As described above, according to the one or more of the above embodiments, the user may conveniently input a search condition and easily recognize details from a search result.

The computer readable code can be recorded/transferred on media in a variety of ways, with examples of the media including recording media, such as magnetic storage media (e.g., ROM, floppy disks, hard disks, etc.) and optical recording media (e.g., CD-ROMs, or DVDs), and transmission media such as Internet transmission media. Thus, a medium may be such a defined and measurable structure including or carrying a signal or information, such as a device carrying a bitstream according to one or more embodiments. The media may also be a distributed network, so that the computer readable code may be stored/transferred and executed in a distributed fashion. A functional program and code and code segments may be easily construed by programmers of ordinary skill in the art.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A video search system comprising:
a search engine configured to extract video data matching a search condition from an original video; and
a browsing engine configured to:
generate a summarized video based on the extracted video data,
render, in real time, a plurality of objects over a background model in the summarized video in an overlapping manner according to a temporal order of appearance of the plurality of objects in the original video, display the plurality of rendered objects over the background model, the temporal order of appearance of the plurality of objects in the original video corresponding to a displaying order of the plurality of rendered objects in the summarized video, and,
in response to a video change request, display a plurality of summarized video layers in the overlapping manner based on at least one of a time basis and a category basis, the background model corresponding to a lowest layer of the plurality of summarized video layers.

2. The video search system of claim 1, wherein the browsing engine is configured to render the plurality of objects by changing a degree of temporal overlapping between the plurality of objects in the summarized video while maintaining the displaying order of the plurality of objects in the summarized video.

3. The video search system of claim 1, wherein the browsing engine is configured to limit a number of the plurality of objects displayed for a predetermined period of time.

4. The video search system of claim 1, wherein the browsing engine is configured to display at least one selected layer of the plurality of summarized video layers, in response to a selection from among the plurality of summarized video layers displayed in the overlapping manner over the background model.

5. The video search system of claim 1, wherein the browsing engine is configured to remove at least one object corresponding to a canceling condition from the summarized video, if the canceling condition is input.

6. The video search system of claim 1, wherein the browsing engine is configured to display at least one object identified in the summarized video as at least one search condition and remove an object corresponding to a search condition selected from the at least one search condition.

7. The video search system of claim 1, further comprising an indexing engine configured to generate index data by structuralizing metadata extracted from the original video, wherein the search engine is further configured to extract the index data matching the search condition and the video data corresponding to the extracted index data.

8. A video search system comprising:
a summarized video generation unit configured to:
generate a summarized video based on a search condition and video data corresponding to the search condition, the video data being extracted from an original video,
render, in real time, a plurality of objects in the summarized video in an overlapping manner according to a temporal order of appearance of the plurality of objects in the original video, and
display the plurality of rendered objects over the background model, the temporal order of appearance of the plurality of objects in the original video corresponding to a displaying order of the plurality of rendered objects in the summarized video;
a three-dimensional (3D) configuring unit configured to three-dimensionally arrange the summarized video into a plurality of summarized video layers in the overlapping manner over the background model based on one of a time basis and a category basis, in response to a video change request, the background model corresponding to a lowest layer of the plurality of summarized video layers; and
a filtering unit configured to display the summarized video from which an object corresponding to a canceling condition is removed, in response to the canceling condition being input.

9. The video search system of claim 8, wherein the summarized video generation unit is configured to render the plurality of objects by changing a degree of temporal overlapping between the plurality of objects in the summarized video while maintaining the displaying order of the plurality of objects in the summarized video.

10. The video search system of claim 8, wherein the summarized video generation unit is configured to limit a number of the plurality of objects displayed for a predetermined period of time.

11. The video search system of claim 8, wherein the 3D configuring unit is further configured to display at least one selected layer of the plurality of summarized video layers, in response to a selection from among the plurality of summarized video layers displayed in the overlapping manner over the background model.

12. The video search system of claim 8, wherein the filtering unit is configured to display at least one object identified in the summarized video as at least one search condition and remove an object corresponding to a search condition selected from the at least one search condition.

13. A video search method comprising:
extracting video data matching a search condition from an original video;
generating a summarized video based on the extracted video data;
rendering, in real time, a plurality of objects over a background model in the summarized video in an overlapping manner according to a temporal order of appearance of the plurality of objects in the original video;

displaying the rendered plurality of objects over the background model, the temporal order of appearance of the plurality of objects in the original video corresponding to a displaying order of the rendered plurality of objects in the summarized video; and in response to a video change request, displaying a plurality of summarized video layers in the overlapping manner over the background model based on at least one of a time basis and a category basis, the background model corresponding to a lowest layer of the plurality of summarized video layers.

14. The video search method of claim 13, wherein the rendering the plurality of objects comprises rendering the plurality of objects by changing a degree of temporal overlapping between the plurality of objects in the summarized video while maintaining a displaying order of appearance of the plurality of objects in the summarized video.

15. The video search method of claim 13, wherein the rendering the plurality of objects comprises limiting a number of the objects displayed for a predetermined period of time.

16. The video search method of claim 13, further comprising displaying at least one selected layer of the plurality of summarized video layers, in response to a selection from among the plurality of summarized video layers displayed in the overlapping manner over the background model.

17. The video search method of claim 13, further comprising removing an object corresponding to a canceling condition from the summarized video, if the canceling condition is input.

18. The video search method of claim 13, further comprising displaying at least one object identified in the summarized video as at least one search condition and removing an object corresponding to a search condition selected from the at least one search condition.

* * * * *